Figure 2:
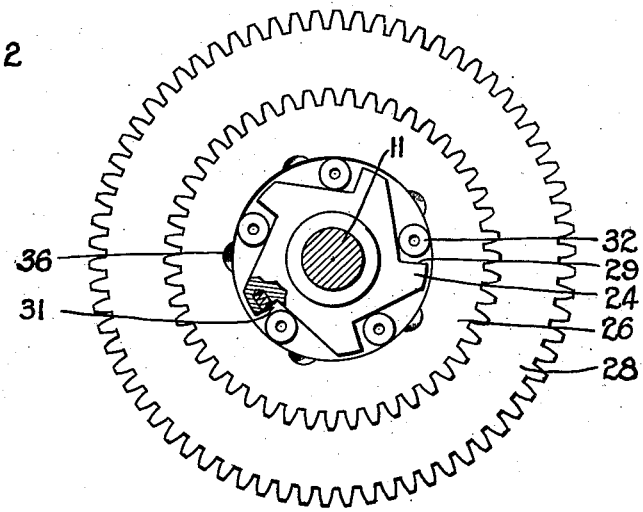

May 20, 1941.  C. W. SWAN  2,242,272
POWER TRANSMITTING DEVICE
Filed May 31, 1938

INVENTOR:
CARL W. SWAN
BY
J. H. B. Whitfield
ATTORNEY.

Patented May 20, 1941

2,242,272

UNITED STATES PATENT OFFICE 2,242,272

POWER TRANSMITTING DEVICE

Carl W. Swan, Chicago, Ill., assignor to Teletype Corporation, Chicago, Ill., a corporation of Delaware Application May 31, 1938, Serial No. 210,816

9 Claims. (Cl. 192—48)

This invention relates to power transmitting devices and particularly to clutch mechanisms.

An object of the invention is to provide instrumentalities for coordinating the rotational velocity of a driven rotary element with that of its driving element.

Another object of the invention is to simplify the operation of assembling a roller bearing clutch mechanism.

The invention features a roller bearing clutch mechanism interposed between a clutch driven cam sleeve and the driving shaft, which permits the cam sleeve to remain stationary while the shaft is rotating and which permits the cam sleeve to equal but not exceed the speed of rotation of the shaft, when rotation is to be imparted to the cam sleeve.

Well-known types of printing telegraph machines have unidirectionally operable positive drive clutches for imparting cyclic rotation to single cams or to cam assemblies. Such clutches may comprise driving and driven elements, one of which is slidable axially of the driving shaft for engagement with and disengagement from the other, and is spring loaded for movement into engagement with the other when a clutch controlling lever is tripped. The driving and driven clutch elements are provided with cooperating teeth which, in order to facilitate the establishment of driving connection between the clutch elements, have one face extending parallel to the axis of rotation and the other face extending oblique thereto. The obliquely extending faces form two cooperating cam surfaces which may tend to shift the axially slidable clutch element away from engagement with the other clutch element, the loading spring permitting such movement, in the event that the driven cam assembly should tend to rotate at a higher velocity than that of its driving shaft. Under such circumstances the slidable clutch element may advance angularly with respect to the other clutch element through a distance of one or more teeth. The angular relationship of the clutch driven cams to other elements associated with the driving shaft would thus be changed.

According to the present invention, the inner clutch element of a roller bearing clutch mechanism is secured to the cam sleeve, which may be driven from a continuously rotating shaft through a positive drive jaw clutch. The outer clutch element of the roller bearing clutch mechanism is secured to the positively rotating shaft which drives the cam sleeve. Spring pressed friction rollers are disposed in notches in the inner roller bearing clutch mechanism so that under certain circumstances they may become wedged in engagement with the inner and outer clutch elements and establish positive connection between the two elements. The notches in the inner clutch element are so related to the direction of rotation of the driving shaft and of the cam sleeve that the outer clutch element may rotate while the inner clutch element is stationary and the inner clutch element may rotate at any speed up to that of the outer element, but if there should be any tendency for the cam sleeve and therefore the inner roller bearing clutch element which it carries to rotate faster than the driving shaft and the outer clutch element, the rollers will become firmly wedged between the inner and outer clutch elements and will limit the speed of the inner element to that of the outer element. Thus, the cam sleeve may not accelerate in response to any torque imparted to it independently of the torque which it receives from the driving shaft through the jaw clutch.

The operation of assembling a roller bearing clutch mechanism may sometimes present difficulties, particularly where flange shaped objects, such as cams, occupy positions in close proximity to the roller bearing clutch mechanism. The insertion of the rollers may further be complicated by the presence of the compression springs individual to each roller which may tend to thrust the roller outwardly and thus interfere with its being fitted into the space provided for it.

The present invention contemplates the provision of clearances formed in the outer element of the roller bearing clutch mechanism. The clearances are formed by cutting away portions of the outer clutch elements at the point of intersection of the internal cylindrical surface with one of the faces of the clutch element. The result of this cutting away of material is the provision of sloping surfaces upon which the fitting of the roller into the space provided for it may be started and upon which the roller may be guided as by a cam surface into the desired position. The spacing of the clearances corresponds to the spacing of the notches in the inner clutch element so that all of the rollers may be fitted into the clutch assembly simultaneously if desired.

Certain features of invention disclosed but not claimed herein are also disclosed and are claimed in copending application, Serial No. 208,761, filed May 19, 1938, by Edward S. Larson.

Figure 1:
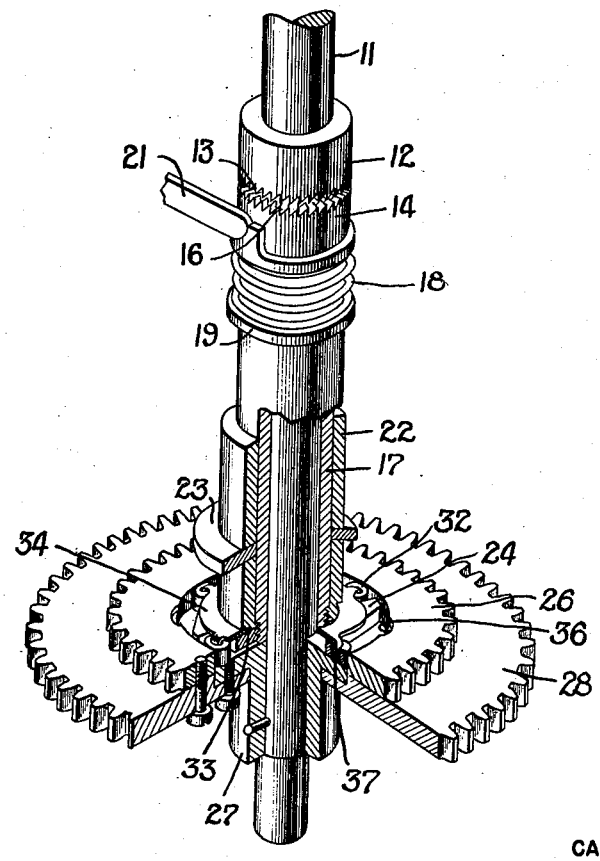

For a complete understanding of the invention, reference may be had to the following detailed description to be interpreted in the light of the accompanying drawing wherein;

Fig. 1 is a perspective view partly in section showing in detail a roller bearing grip clutch according to the present invention, and its relation to a cam sleeve and driving shaft; and Fig. 2 is a plan view of the roller bearing grip clutch mechanism.

Referring now to the drawing and particularly to Fig. 1, the reference numeral 11 designates a power driven shaft to which is secured the driving element 12 of a positive clutch mechanism. The driving clutch element 12 is provided with teeth 13 each of which has one face parallel to the axis of shaft 11 and another face in a plane oblique to the axis of the shaft. A driven clutch element 14 having teeth 16 for cooperation with teeth 13 is sleeved on shaft 11 so as to be capable of remaining stationary while shaft 11 rotates. Driven clutch element 14 is slidable axially of shaft 11 and is splined to a sleeve 17 carried by the shaft. A compression spring 18 confined between driven clutch element 14 and a flange 19 carried by the upper end of sleeve 17 urges driven clutch element 14 into engagement with driving element 12. A clutch throwout 21 normally restrains driven clutch element 14 from movement into engagement with driving element 12 and upon the withdrawal of clutch throwout lever 21 compression spring 18 moves driven clutch element 14 axially of shaft 11 into engagement with driving element 12 whereby rotation will be imparted to driven element 14 and thus to sleeve 17.

Sleeve 17 supports and has secured thereto a sleeve 22 which is the element to be driven and may be a cam sleeve which includes one or more cams such as the cam 23. Inner sleeve 17 is threaded at its lower end and the inner member 24 of a roller bearing grip clutch is threadedly secured to the lower end of the sleeve 17. Member 24 fits into the central aperture of a ring gear 26 and is retained in close proximity to the hub 27 of a gear 28 as shown in Fig. 1. Inner clutch member 24 has a plurality of substantially right angled notches cut in the periphery thereof, the faces defining these notches being of unequal lengths, the shorter of the two faces of each notch designated by the reference numeral 29, extending substantially radially of the member 24. The angularly disposed faces of the notches and the adjacent arcuate inner surface of ring gear 26 define recesses that are generally triangular, being bounded by two plane surfaces and a curved surface. Each of the short faces 29 of the notches in member 24 is recessed to receive and support one end of a compression spring 31. An axially drilled roller 32 is disposed in each of the generally triangular recesses and the compression spring 31 tends to wedge the roller between the long face of the notch and the arcuate internal surface of ring gear 26.

The lower end of cam sleeve 22 is undercut to provide a shoulder 33 against which a retainer ring 34 is placed before member 24 is secured to sleeve 17. Retainer ring 34 fits loosely on the undercut portion of sleeve 22 and is not clamped in place but is free to rotate. Ring 34 serves as a partial cover for rollers 32 and prevents them from escaping from their recesses in the event that an assembled apparatus including the unit shown in Fig. 1 is inverted such as, for example, during packing or shipment.

The presence of ring 34 necessitates the fitting of member 24 and rollers 32 into position in ring gear 26 at the same time, as rollers 32 cannot be placed in their respective recesses after member 24 has been lowered into ring gear 26. The manipulation of the several rollers 32 during the assembly of the roller bearing clutch mechanism is rendered difficult by compression springs 31 which may tend to thrust rollers 32 out of the position in which they must be confined in order to enter ring gear 26. Simplification of the insertion of inner clutch member 24 and rollers 32 into ring gear 26 may be afforded by providing clearance recesses 36 in ring gear 26. Recesses 36 are cut partially into the inner cylindrical surface of ring gear 26 and partially into the upper face thereof, thus providing inwardly sloping cam surfaces. In fitting the inner clutch member 24 and rollers 32 into ring gears 26, the member 24 may be positioned and held in such angular relation to ring gear 26 that each of the rollers 32 may be in position to enter a clearance recess 36, the springs 31 being held under slight compression. The inner clutch member 24 may then be rotated counterclockwise to effect increased compression of springs 31 and to bring a wider portion of each of the roller recesses into alignment with its roller. The clearance recesses 36 assist in holding rollers 32 against outward thrust and also provide sloping surfaces for guiding the rollers 32 into the interior of ring gear 26. As internal clutch member 24 is further rotated clockwise the rollers 32 may be worked farther down into their respective recesses and the tendency for them to be thrust outwardly is correspondingly decreased until finally the rollers may be pushed entirely into their recesses.

Further simplification of the insertion of inner clutch member 24 and rollers 32 into ring gear 26 has been afforded by providing ring 34 with depending fingers 37 so that ring 34 may be employed as an implement for locating rollers 32 well into the notches in member 24 and for holding them in such position in opposition to their compression springs 31 while the subassembly is being inserted into ring gear 26. The rollers 32 are provided with axial bores of sufficient size that the rollers may fit loosely on dependng fingers 37 of ring 34. When it is desired to fit the subassembly comprising cam sleeve 22, its supporting sleeve 17, inner clutch member 24, and retaining ring 34 into final position with inner clutch member 24 seated inside ring gear 26, a roller 32 is placed upon each of the fingers 37 of ring 34. Each of the rollers 32 is held on its finger 37 by the frictional engagement of its compression spring 31 with the periphery of the roller. After all of the rollers 32 have been placed upon the fingers 37, ring 34 may be rotated in clockwise direction to compress springs 31 to a considerable extent, thus bringing rollers 32 as close as possible to the radial faces 29 of the notches in inner clutch member 24 at which point the recesses which will be formed when member 24 is lowered into ring gear 26 will be of greatest width. Rollers 32 do not need to be held nor manipulated individually as ring 34 imparts to all of them the desired movement toward radial faces 29 of the notches in member 24. With rollers 32 held well within the confines of the notches in member 24 by ring 34 the assembly may be lowered into ring gear 26, after which the hold upon ring 34 may be released, thus permitting springs 31 to move rollers 32 into frictional engagement with the long faces of the notches and with the internal surface of ring gear 26, ring 34 rotating freely to permit this movement of roller 32.

An understanding of the exact nature of the clutch by which cam sleeve 22 is driven, is prerequisite to an understanding of the utility of the roller bearing clutch consisting of the member 24, rollers 32, and ring gear 26, the roller bearing clutch being used in the present invention as a brake. For the purpose of this description of the jaw clutch and of its operating characteristics, let it be assumed that the roller bearing clutch is not present in the structure. Cam sleeve 22 is driven by driving clutch element 12 and driven element 14 as previously described. This clutch mechanism is of the well-known one-way driving construction. Each tooth of both elements of the clutch has one face substantially in a plane passing through the axis of the clutch and the other surface oblique thereto. Should any torque be applied to the driven element 14 of the clutch which exceeds the torque applied by the driving element 12 the sloping surfaces of the teeth of one clutch element may slide upon the sloping surfaces of the teeth of the other clutch element, thus shifting driven element 14 axially away from driving element 12 and compressing spring 18. If the differential between the two torques is appreciable the driven element may be rotated ahead of the driving element a distance equal to the extent of several teeth of the clutch member. A torque of sufficient magnitude to cause driven element 14 to rotate more rapidly than driving element 12 and thus to gain upon it may be generated by a heavily biased cam follower riding down a sharply descending slope of the cam 23 and thus becoming a negative load upon the driven clutch element 14.

The roller bearing clutch serves as a brake, as previously described, to prevent acceleration of cam assembly sleeve 22 under the influence of negative load upon any of its cams. Whenever cam sleeve 22 is stationary and the gears 26 and 28 are rotating, inner roller bearing clutch member 24 which is secured to sleeve 17 and therefore indirectly to cam assembly sleeve 22 is also stationary and the frictional engagement between the inner surface of ring gear 26 and rollers 32 tends to move the rollers toward the widest portion of the recesses in which they are seated, the rollers thus being moved substantially free of inner clutch member 24 so that there is no tendency of gear 26 to impart rotation to the inner clutch member. When cam assembly sleeve 22 is released for rotation and is rotating at the same speed as gear 26, there is no relative movement between roller bearing clutch member 24 and the ring gear 26 and springs 31 tend to wedge rollers 32 between the long faces of the notches in inner clutch member 24 and inner surface of gear 26. If cam sleeve 22 should be subjected to a torque which tends to rotate it faster than gears 26 and 28, the frictional engagement of rollers 32 with member 24 tends to increase the wedging of the rollers between member 24 and the gear 26 so that a positive lock between inner roller bearing clutch member 24 and gear 26 is established and cam sleeve 22 is prevented from accelerating in response to the locally applied torque and is held to the speed of rotation of gear 28.

Although a specific embodiment of the invention has been disclosed and described herein, it will be understood that the invention is not limited to such specific embodiment but is capable of modification, reorganization, rearrangement, and substitution of parts and elements without departing from the spirit of the invention and within the scope of the appended claims.

What is claimed is:

1. In a power transmitting mechanism, a continuously rotating shaft, a work performing assembly supported by said shaft, unidirectionally operable means for establishing driving connection between said shaft and said assembly, and means for limiting the rotational velocity of said assembly to that of said shaft.

2. In a power transmitting mechanism, a continuously rotating shaft, a work performing assembly supported by said shaft, means engageable positively in the direction of rotation of said shaft for imparting rotation to said assembly, and over-running clutch means carried by said assembly and said shaft for limiting the rotational velocity of said assembly to that of said shaft.

3. In a power transmitting mechanism, a continuously rotating shaft, a cam assembly supported by said shaft, a driving clutch element connected to said shaft, a cooperating driven clutch element connected to said cam assembly and capable of over-running said driving clutch element, and cooperating friction clutch elements associated with said shaft and said cam assembly for limiting the velocity of said cam assembly to that of the shaft.

4. In a power transmitting device, a continuously rotating shaft, a work performing cam assembly supported by said shaft, a driving clutch element connected to said shaft, a driven clutch element connected to said cam assembly and slidable axially of said shaft for engagement with said driving clutch element, teeth carried by said clutch elements having sloping faces to facilitate engagement of said clutch elements and effective in response to excessive velocity of said cam assembly to shift said driven clutch element axially of said shaft, and roller bearing friction clutch means having a clutch member associated with said cam assembly and a clutch member associated with said shaft for limiting the velocity of said cam assembly to that of said shaft.

5. In a power transmitting device, a continuously rotating shaft, a work performing cam assembly supported by said shaft, a driving clutch element connected to said shaft, a driven clutch element splined to said cam assembly for movement axially of said shaft, yieldable means for urging said driven element into engagement with said driving element, toothed interengagement means carried by said clutch elements and effective under predetermined conditions to cam said driven element axially of said shaft and momentarily out of interengagement with said driving element, and cooperative means associated with said shaft and said cam assembly for assuring the avoidance of said predetermined conditions.

6. In a power transmitting device, a continuously rotating shaft, a work performing cam assembly supported by said shaft, a driving clutch element connected to said shaft, a driven clutch element splined to said cam assembly for movement axially of said shaft, yieldable means for urging said driven element into engagement with said driving element, toothed interengagement means carried by said clutch elements and effective in response to tendencies of said cam assembly toward rotation more rapidly than said shaft to cam said driven element axially of said shaft and momentarily out of interengagement with said driving element, a cylindrically apertured member secured to said shaft, a member secured to said cam assembly and disposed in the cylindrically apertured member, said member having notches in the periphery thereof forming with the wall of the cylindrical aperture recesses diminishing in width in a direction opposite to that of rotation of said shaft and cam assembly, and spring pressed rollers disposed in said apertures and adapted to limit the rotational speed of said cam assembly to that of said shaft by becoming wedged in said recesses.

7. In a roller bearing clutch mechanism, a cylindrically apertured external clutch member, a peripherally notched internal clutch member disposed within said external member and forming therewith a plurality of tapered recesses, and a spring pressed roller disposed in each of said recesses, said external member having sloping clearances leading into the aperture therein for guiding said rollers into the recesses during assembly of said clutch mechanism.

8. In a roller bearing clutch mechanism, a cylindrically apertured external clutch member, a peripherally notched internal clutch member disposed within said external member and forming therewith a plurality of tapered recesses, and a spring pressed roller disposed in each of said recesses, said external member having clearances formed by cutting away portions thereof at the intersection of an external surface with the wall of the cylindrical aperture for guiding said rollers into the recesses during assembly of said clutch mechanism.

9. In a roller bearing clutch mechanism, a cylindrically apertured external clutch member, a peripherally notched internal clutch member disposed within said external member and forming therewith a plurality of tapered recesses, and a spring pressed roller disposed in each of said recesses, said external member having arcuate indentations at the intersection of an external surface with the wall of the cylindrical aperture for guiding said rollers into the recesses during the assembly of said clutch mechanism.

CARL W. SWAN.